United States Patent [19]
Millen

[11] Patent Number: 5,333,830
[45] Date of Patent: Aug. 2, 1994

[54] COMPOSITE EQUIPMENT SUPPORT PAD
[75] Inventor: Frank Millen, Gaffney, S.C.
[73] Assignee: Pacolet Concrete Company, Gaffney, S.C.
[21] Appl. No.: 903,717
[22] Filed: Jun. 24, 1992
[51] Int. Cl.⁵ .............................................. F16M 5/00
[52] U.S. Cl. .................................... 248/679; 248/678
[58] Field of Search ............ 248/678, 679; 52/309.6, 52/309.15, 309.17; 108/51.1

[56] References Cited

U.S. PATENT DOCUMENTS

| | | | |
|---|---|---|---|
| 2,840,430 | 6/1958 | Winer | 108/51.1 |
| 2,849,758 | 9/1958 | Plumley et al. | 52/309.15 |
| 3,004,777 | 10/1961 | Buonaccorsi . | |
| 3,424,413 | 1/1969 | Applegate . | |
| 4,056,251 | 11/1977 | Dixon et al. . | |
| 4,067,164 | 1/1978 | McMillan . | |
| 4,084,362 | 4/1978 | Piazza . | |
| 4,186,536 | 2/1980 | Piazza . | |
| 4,212,446 | 7/1980 | Domanick et al. . | |
| 4,229,497 | 10/1980 | Piazza . | |
| 4,505,449 | 3/1985 | Turner et al. . | |
| 4,869,456 | 9/1989 | Jacobs | 248/678 |
| 5,149,050 | 9/1992 | Smith et al. | 248/679 |

FOREIGN PATENT DOCUMENTS 2332373  6/1977  France ................. 52/309.6

OTHER PUBLICATIONS

Advertisement–Conventional Concrete Pads From Diversitech Corporation.
Advertisement–Lightweight Equipment Pads From Pacolet Concrete Const.
Advertisement–Ultralite From Diversitech Corporation.

Primary Examiner—Eugenia Jones
Assistant Examiner—Allan M. Schrock
Attorney, Agent, or Firm—Dority & Manning

[57] ABSTRACT

A composite support pad for supporting heavy equipment such as a transformer or air conditioner unit is provided. The pad includes a cellular core member having a network of contiguous cells laminated between a top facing sheet and a bottom facing sheet to enclose the ends of the cells, The cellular core member is set or otherwise embedded in a cementitious shell material or outer covering, The cellular core member may be formed of paper or fibrous material and the cellular structure offers a relatively high degree of rigidity and structural support without adding unnecessary weight to the support pad, The flexibility of the core material also enables the pad to conform to a degree to surfaces on which the pad is placed.

10 Claims, 2 Drawing Sheets

U.S. Patent    Aug. 2, 1994    Sheet 1 of 2    5,333,830
Fig. 1
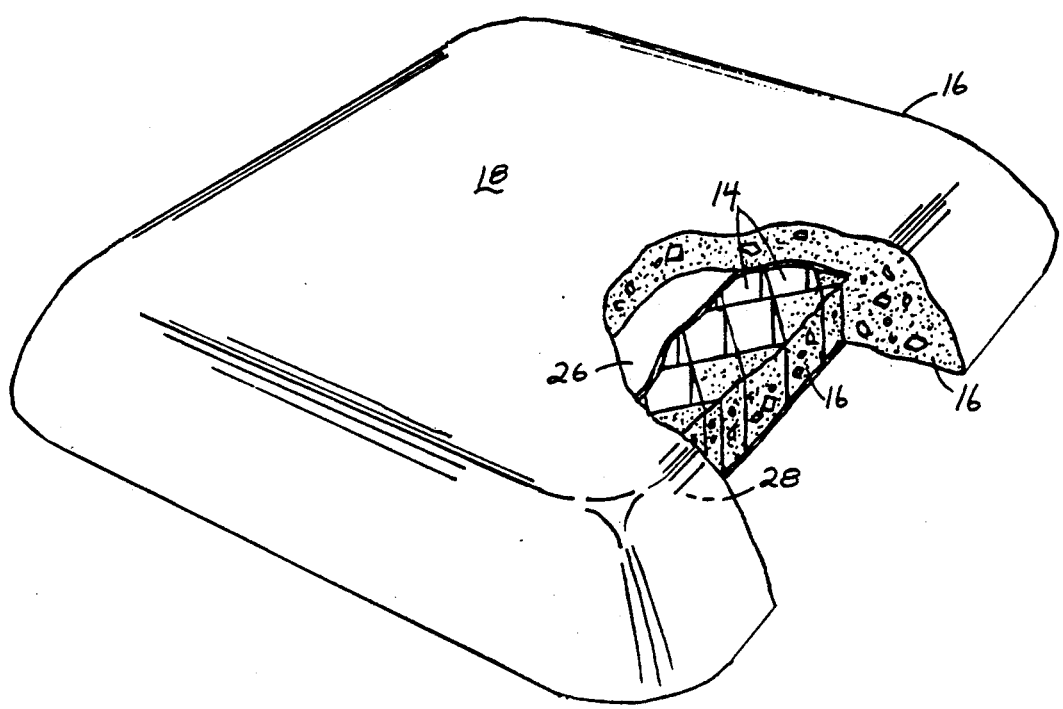
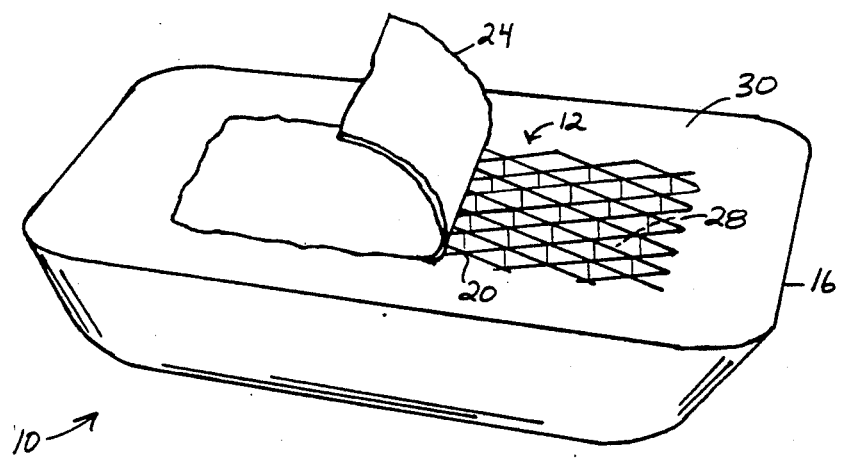
Fig. 2

COMPOSITE EQUIPMENT SUPPORT PAD

BACKGROUND OF THE INVENTION

The present invention relates generally to an equipment support pad, and in particular to a lightweight equipment support pad having a generally hollow interior.

The high cost of concrete bases or pads poured on-site for various types of air conditioning, heating, and electrical equipment has given rise to a growing market for pre-cast concrete pads. Even though such pre-cast pads are usually less expensive than on-site poured pads, they are generally very heavy and require heavy equipment or several laborers to set in place. Furthermore, such pads are expensive to ship and are prone to breakage.

Certain composite pads have been suggested for replacing the pre-cast concrete pads. For instance, U.S. Pat. No. 4,186,536 shows a pad having a foam core encapsulated in reinforced cementitious material. U.S. Pat. No. 4,056,251 to Dixon et al. discloses a lightweight plastic transformer pad formed of plastic or other synthetic material having an upper surface and lower surface defining an internal cavity. A heat expansible foam material is poured into the cavity.

A more recent patent, U.S. Pat. No. 4,505,449, issued Mar. 19, 1985, to Turner et al. suggests a composite base comprising an expanded foam core such as a polystyrene foam board which is carried on only its sides and tops with a fiberglass reinforced cement material to form a solid base. Heavy steel coils are embedded in the composite material for reinforcing steel posts or the like which serve to mount air conditioners or other heavy equipment. The pads and bases illustrated in the prior art noted above failed to completely satisfy the load and cost limitations and considerations of pre-cast concrete pads.

OBJECTS AND SUMMARY OF THE INVENTION

It is a principle object of the present invention to provide a composite support pad for supporting heavy equipment which is generally lightweight, having a generally hollow interior, without sacrificing structural support or strength.

A further object of the present invention is to provide a composite support pad wherein the weight of the pad is substantially reduced making it easier to handle such pads during shipment and installation.

Still another object of the present invention is to provide a heavy equipment pad which appears to be an ordinary solid concrete block, but which in fact is a low density material embedded in a cementitious material thereby giving the appearance of concrete.

Yet a further object of the present invention is to provide a generally hollow concrete equipment support pad with an intra-structure of open cells for providing the pad with a high degree of strength and stability without adding weight to the support pad.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a composite support pad having an equipment support surface for supporting heavy equipment is provided. The composite support pad includes a cellular core component which further comprises a network of generally hollow or open cells. The support pad further includes a cementitious shell material, such as concrete or cement, generally surrounding the cellular core component. The cellular core component is non-movably set or embedded in the shell material. At least one surface of the shell material, preferably the top surface, forms the equipment support surface with the cellular core component being disposed generally beneath the equipment support surface and non-movably set in the shell material.

In one preferred embodiment of the present invention, the cellular core component of the present invention comprises a honey-combed network of connected cells. The honey-combed network of cells may be defined by, for instance, interposed sheets of paper or wood pulp material. The paper material may be laminated or otherwise treated if desired for desired weather resistance characteristics.

In an alternative preferred embodiment, the cellular core component of the invention comprises a plurality of multi-sided cells. The shape of the cells may vary and includes a four-sided cell, hexagonal cell, etc.

The cementitious shell material according to the invention can comprise any known conventional material, such as concrete, cement, plastic or any other suitable hard pourable material. The material may further include reinforcing fibers mixed throughout.

And yet in another preferred embodiment of the invention, the cellular core member further includes a top facing sheet and a bottom facing sheet. In this embodiment the network of cells is defined between the top facing sheet and the bottom facing sheet. Inclusion of the top and bottom facing sheets is preferred in that the shell material can be poured or otherwise formed around the cellular core component without the shell material filling the cells of the core component.

According to the invention, the cellular core component of the invention is non-movably set or embedded in the shell material. Accordingly, in one preferred embodiment, at least one of the cells of the core member is at least partially filled with the cementitious material thereby ensuring the core component is securely embedded in the shell material. For example, the periphery cells of the cellular core component in this embodiment may not be completely enclosed. In other words, the cells may comprise partial cells whereby when the cementitious material is poured or otherwise formed around the core component, these partial cells are filled at least partially with the shell material.

The accompanying drawings which are incorporated in and constitute a part of this specification, illustrate one embodiment of the invention and, together with the description, serve to explain the principles of the invention.

BRIEF DESCRIPTION OF THE DRAWINGS

A full enabling disclosure of the present invention, including the best mode thereof, directed to one of ordinary skill in the art, is set forth in the remainder of the specification, which makes reference to the appended figures, in which:

FIG. 1 is a perspective view of the composite support pad of the invention shown in partial cut-away to show the core component thereof;

FIG. 2 is a perspective of the support pad of FIG. 1 inverted with the bottom facing sheet of the core component partially peeled back to illustrate the cell structure of the core component.

DETAILED DESCRIPTION OF THE INVENTION

Figure 3:
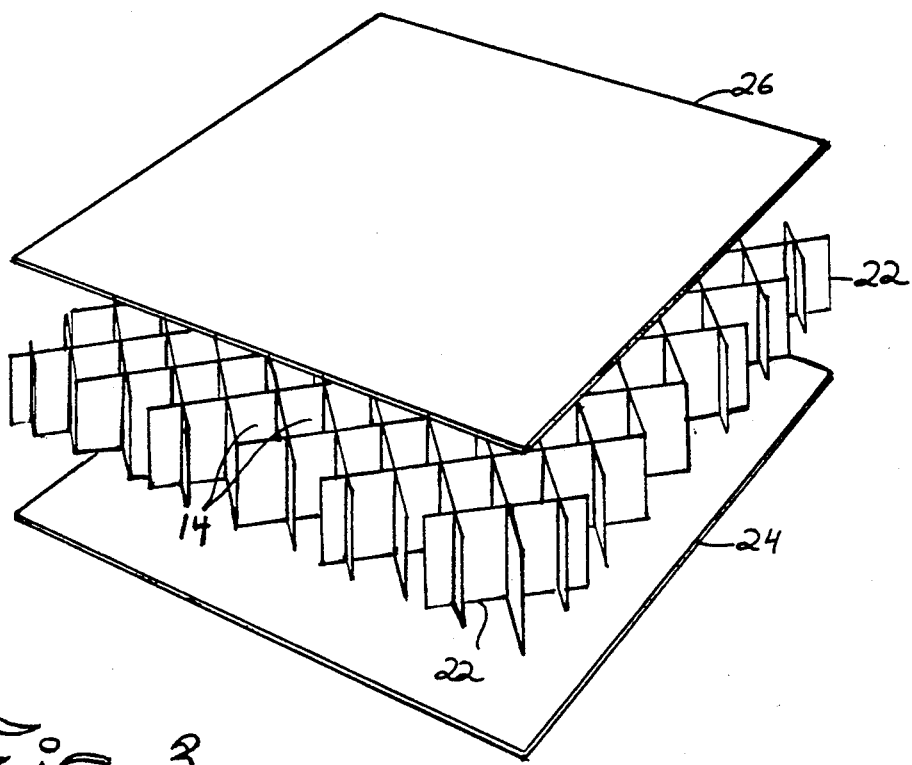
FIG. 3 is an exploded perspective view of the cellular core structure according to the invention showing details of its construction.

Reference will now be made in detail to the presently preferred embodiments of the invention, one or more examples of which are illustrated in the accompanying drawings. Each example is provided by way of explanation of the invention not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

In accordance with the present invention, and as illustrated in the figures in general, composite support pad or equipment support pad 10 is provided having equipment support surface 18 for supporting heavy equipment thereon. Support pad 10 is illustrated for convenience as being rectangular in shape with equipment support surface 18 being the top portion thereof. This is for means of illustration purposes only and it should be understood that support pad 10 is not limited to a rectangular shape. For example, support pad 10 may just as well circular or square. The height of support pad 10 may also vary with a two inch pad being a nominal height in the industry.

Support pad 10 includes cellular core component 12. Core component 12 further includes a network of generally hollow or open cells 14. Support pad 10 further includes cementitious shell material or outer covering 16 generally surrounding core component 12. Core component 12 is non-movably set in shell material 16. Core component 12 may be embedded in shell material 16 by, for example, forming shell material 16 around core component 12 so that at least a portion of at least one cell 14 is filled with shell material 16. Core component 12 is generally disposed beneath equipment support surface 18 of pad 10.

In a preferred embodiment of the invention, as depicted particularly in FIGS. 1 and 3, core component 12 comprises a network of contiguous cells 14. This network of cells may comprise a honey-combed network 20, as shown in FIG. 2, or some other arrangement of a plurality of multi-sided cells 14. In an alternative embodiment not depicted in the figures, cells 14 may be circular in cross-section and need not contain flat planar sides.

Cells 14 of core component 12 may preferably be defined by a lightweight paper product or sheeting material 22. A preferred material for defining cells 14 is the Honeycomb product manufactured by International Honeycomb Connecticut, Inc. Honeycomb is a construction of paper products consisting of a network of contiguous cells. In a preferred embodiment cells 14 are laminated in between a top facing sheet 26 and a bottom facing sheet 24, as particularly shown in FIG. 3. The paperweight of the papers used for manufacturing the cell network 14 may vary from, for example, a 26 lb. kraft to a 90 lb. kraft paper. The paper products may be impregnated to add the feature of water resistance to core component 12.

The length and width of core component 12 may be varied to allow for multiple manufacturing requirements and varying sizes of support pad 10. In a nominal two inch support pad 10, cells 14 are generally one half inch from side to side with a overall height of 1.5 inches. Thus, in a two inch support pad 10 having a cell 14 height of 1.5 inches, at least one half inch of shell material 16 is disposed above cells 14 and forms equipment support surface 18.

The Honeycomb product by International Honeycomb is an example of a preferred embodiment of core component 12 that can be used in the present invention. Other suitable lightweight materials may be used to define cells 14, for instance plastic or metal strips may also be used.

As mentioned, in a preferred embodiment, core component 12 further includes top facing sheet 26. This sheet 26 is disposed above cells 14 with shell material 16 lying on top of sheet 26, as shown particularly in FIG. 1. In this manner, shell material or outer covering 16 disposed above core structure 12 comprises equipment support surface 18. In this embodiment, top surface 26 is preferred in that it is relatively easy to pour or otherwise form outer covering or shell material 16 around core structure 12 without filling cells 14 with shell material 16. However, it may be that shell 16 is pre-formed or cast with a generally hollow interior or pocket 28, depicted generally in FIGS. 1 and 2. In this embodiment, core structure 12 may be placed within interior pocket 28 and appropriately embedded or otherwise set therein. Alternatively, a relatively thin slab of material 16 may be pre-formed whereby core component 12 is set upon the scab. Subsequently, material 16 may be poured around core 12 thereby forming the sides of pad 10.

Bottom facing sheet 24 may also be included with support pad 10 to generally seal pockets 14, as shown particularly in FIG. 2. Core component 12 may be flush with bottom surface 30 of support pad 10 as shown in FIG. 2, or core structure 12 may be disposed slightly beneath the plane of bottom surface 30. In this manner, bottom facing sheet 24 may be provided to seal cells 14 from the bottom and, if desired, a relatively small amount of shell material 16 may be poured or otherwise formed on top of bottom facing sheet 24. In this manner, from all outward appearances, support pad 10 would appear to comprise a solid block of shell material 16.

Core component 12 is non-movably set in shell material 16. Preferably, as shown in FIG. 1, at least one of the cells 14 is a partially open cell into which shell material 16 may flow. In this manner, when material 16 sets or otherwise hardens, sheeting material 22 forming cells 14 is embedded within shell material 16. Alternatively, top facing sheet 26 may have openings at certain points therein so that material 16 will flow up through sheet 26 into certain of cells 14.

Shell material 16 is preferably formed of concrete or cement or other cement-like material such as a hard plastic or resin. Shell material 16 may further include other strengthening materials, such as fiberglass or polypropylene fibers oriented or otherwise admixed throughout. Fiber reinforcement of a concrete mass is known in the art and not inventive to the present invention. For example, Forta Corporation of Grove City, Pennsylvania, provides a line of fiber reinforcements for concrete available in mixer ready bags. The bags of fiber can be tossed directly into a cement mixer and are distributed throughout the mix.

While a preferred embodiment of applicant's invention has been described above in detail, it will be understood by those skilled in the art that variations in the structure and the materials used to construct the composite support pad of the invention may be varied within the scope of the claims appended hereto.

What is claimed is:

1. A composite support pad having an equipment support surface for supporting heavy equipment, comprising:
   a cellular core component, said cellular core component further comprising a network of generally hollow cells;
   a cementitious shell material generally surrounding said cellular core component, said cellular core component being non-movably set in said shell material, whereby an outer surface of said shell material forms said equipment support surface with said cellular core component being disposed generally beneath said equipment support surface and set in said shell material and;
   wherein at least one of said cells of said core component is at least partially filled with said cementitious shell material thereby ensuring said core component is securely set in said shell material.

2. The support pad as in claim 1, wherein said cellular core component comprises a honeycombed network of connected cells.

3. The support pad as in claim 1, wherein said cellular core component comprises a plurality of multi-sided cells.

4. A support pad as in claim 1, wherein said cellular core component is composed of a paper product.

5. A support pad as in claim 1, wherein said cementitious shell material comprises concrete.

6. A support pad as in claim 1, wherein said cellular core component further comprises a first facing sheet and a second facing sheet with said network of generally hollow cells being defined between said first facing sheet and said second facing sheet.

7. A generally lightweight equipment support pad having a hard outer covering and a generally hollow interior, comprising:
   a cement shell having a first equipment supporting surface and a second surface, said cement shell defining a generally hollow interior pocket; and
   a plurality of open cells disposed within said hollow interior pocket, said open cells being defined by generally lightweight sheeting material disposed within said hollow interior pocket and set in said dense shell, said open cells providing structural support to said support pad without adding undesirable weight thereto, at least one of said cells being at least partially filled with said cement shell material thereby ensuring said sheeting material is securely set in said cement shell.

8. The equipment support pad as in claim 7, wherein said open cells are formed with paper product sheeting material.

9. The equipment support pad as in claim 7, further comprising a first facing material disposed within said interior pocket between a top of said open cells and said shell.

10. The equipment support pad as in claim 9, further comprising a second facing material covering said open cells and generally flush with said second surface of said equipment support pad.

* * * * *